United States Patent
Wen

(10) Patent No.: US 10,691,415 B2
(45) Date of Patent: Jun. 23, 2020

(54) RANDOM NUMBER GENERATION AND ACQUISITION METHOD AND DEVICE

(71) Applicant: Alibaba Group Holding Limited, George Town (KY)

(72) Inventor: Jiaxiang Wen, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/131,352

(22) Filed: Sep. 14, 2018

(65) Prior Publication Data

US 2019/0012147 A1   Jan. 10, 2019

Related U.S. Application Data

(63) Continuation of application No. PCT/CN2017/075828, filed on Mar. 7, 2017.

(30) Foreign Application Priority Data

Mar. 17, 2016   (CN) .......................... 2016 1 0152995

(51) Int. Cl.
*G06F 7/58*   (2006.01)
*G06F 9/30*   (2018.01)

(52) U.S. Cl.
CPC ............ *G06F 7/588* (2013.01); *G06F 7/58* (2013.01); *G06F 9/30021* (2013.01)

(58) Field of Classification Search
None
See application file for complete search history.

(56) References Cited

U.S. PATENT DOCUMENTS

| 7,236,996 B2 | 6/2007 | Ong | |
| 2003/0039357 A1* | 2/2003 | Alten | G06F 7/582 380/46 |
| 2010/0005133 A1* | 1/2010 | Choi | H03M 13/2742 708/491 |
| 2010/0115231 A1* | 5/2010 | Yui | G06F 7/582 711/221 |
| 2013/0304781 A1 | 11/2013 | Dey | |

(Continued)

FOREIGN PATENT DOCUMENTS

| CN | 101105742 | 1/2008 |
| CN | 101636714 | 1/2010 |
| CN | 102541508 | 7/2012 |

(Continued)

OTHER PUBLICATIONS

International Search Report by the International Searching Authority issued in International Application No. PCT/CN2017/075828 dated Jun. 15, 2017; 9 pages.

(Continued)

Primary Examiner — Chuong D Ngo
(74) Attorney, Agent, or Firm — Fish & Richardson P.C.

(57) ABSTRACT

Multiple random numbers are generated. The multiple random numbers are N different random numbers. N is a positive integer. Generating the multiple random numbers includes generating a random number array including N storage units. The multiple random numbers are shuffled. A random number obtaining instruction is received. A random number is obtained from the multiple random numbers based on the random number obtaining instruction.

14 Claims, 10 Drawing Sheets

(56) References Cited

U.S. PATENT DOCUMENTS

2014/0146607 A1    5/2014   Nagai et al.

FOREIGN PATENT DOCUMENTS

| CN | 103034471 | 4/2013 |
|---|---|---|
| CN | 103645882 | 3/2014 |
| FR | 2829643 | 3/2003 |
| JP | 2006155168 | 6/2006 |
| WO | WO 2016095555 | 6/2016 |

OTHER PUBLICATIONS

Extended European Search Report in European Application No. 17765739.2, dated Oct. 10, 2019, 9 pages.
PCT International Preliminary Report on Patentability in International Application No. PCT/CN2017/075828, dated Sep. 18, 2018, 9 pages (with English translation).
The art of computer programming, Passage, 3rd ed., Addison Wesley Longman, Jan. 1998, Chapter 3, 43 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Knuth et al, "The Art of Computer Programming," Seminumerical Algorithms, Addison Wesley, 3rd Edition, vol. 2, 1998, 21 pages (Machine Translation).

\* cited by examiner

RANDOM NUMBER GENERATION AND ACQUISITION METHOD AND DEVICE

CROSS-REFERENCE TO RELATED APPLICATIONS

This application is a continuation of PCT Application No. PCT/CN2017/075828, filed on Mar. 7, 2017, which claims priority to Chinese Patent Application No. 201610152995.2, filed on Mar. 17, 2016, and each application is hereby incorporated by reference in its entirety.

TECHNICAL FIELD

The present application relates to the field of computer technologies, and in particular, to a random number generation and retrieval method and device.

BACKGROUND

Requirements become increasingly high for random number generation as random numbers are widely applied in the computer field. Currently, there are two commonly-used random number generation methods. One is a software method in which system time is used as a seed for random number generation, and then a random number is generated based on a system function. The other is a hardware method in which a hardware device generating a random number is designed to generate a random number based on a random signal.

However, a system default random number generation method used by the software has the following disadvantage: Random numbers generated at the same time point (the same second, or the same millisecond) have a high repetition rate, resulting in imbalanced distribution of random numbers, that is, pseudorandom numbers are generated. In a computer application system, time is used as a seed for random number generation, therefore, due to the same time seeds, random numbers generated within a relatively short time such as duration including same milliseconds or seconds have a high repetition rate, resulting in imbalanced distribution of random numbers.

SUMMARY

The purpose of the present application is to resolve one of the previous technical problems to a certain extent.

Thus, the first purpose of the present application is to provide a random number generation method. The method includes the following: generating a random number array that includes N storage units storing random numbers; then, performing random shuffling on the storage units in the random number array; and when receiving a random number retrieval instruction, read a random number from a corresponding storage unit in the random number array. In the implementations of the present application, a plurality of random numbers obtained in a relatively short unit time have a low repetition rate to achieve balanced distribution. Therefore, the random number generation method in the present application can achieve relatively high randomness.

The second purpose of the present application is to provide a random number generation device.

The third purpose of the present application is to provide a random number retrieval method.

The fourth purpose of the present application is to provide a random number retrieval device.

To achieve the previous purposes, a first aspect of the implementations of the present application provides a random number generation method, including the following steps: generating a random number array, where the random number array includes N storage units, each of the storage units stores a random number, and N is a positive integer; performing random shuffling on the storage units in the random number array; and when receiving a random number retrieval instruction, read, from a corresponding storage unit in the random number array based on the random number retrieval instruction, a random number stored in the storage unit.

The random number generation method in the implementations of the present application includes the following: first generating the random number array that includes the N storage units storing the random numbers; then, performing random shuffling on the storage units in the random number array; and receiving the random number retrieval instruction, and reading, from the corresponding storage unit in the random number array, the random number stored in the storage unit. Because random shuffling is performed on the storage units in the random number array, a plurality of random numbers obtained in a relatively short unit time have a low repetition rate, to achieve balanced distribution. Therefore, the random number generation method in the present application can achieve relatively high randomness.

In an implementation of the present application, the N storage units store different random numbers.

In an implementation of the present application, in the random number generation method, each of the storage units has an identifier value, and the performing random shuffling on the storage units in the random number array includes the following: generating a random value based on a random function, and generating an identifier value of a to-be-exchanged storage unit based on the random value; and exchanging a random number in the to-be-exchanged storage unit with a random number in a target storage unit based on the identifier value and a predetermined exchange rule.

In an implementation of the present application, the generating a random value based on a random function includes the following: when i is greater than 1 and less than N, generating the ith random value based on a current time and the (i−1)th random value, where i is the number of exchange times; or when i is equal to 1, generating the ith random value based on a current time.

In an implementation of the present application, the predetermined exchange rule is as follows: When the ith exchange is performed, a random number in a storage unit corresponding to the ith random value is exchanged with a random number in the (N+1−i)th storage unit.

In an implementation of the present application, the reading, from a corresponding storage unit in the random number array based on the random number retrieval instruction, a random number stored in the storage unit includes the following: obtaining an identifier value of a currently read storage unit based on the random number retrieval instruction; and reading, based on the identifier value of the currently read storage unit, a random number stored in a next storage unit.

To achieve the previous purposes, a second aspect of the implementations of the present application provides a random number generation device, including: a generation module, configured to generate a random number array, where the random number array includes N storage units, each of the storage units stores a random number, and N is a positive integer; a random shuffling module, configured to perform random shuffling on the storage units in the random number array; and a reading module, configured to receive a random number retrieval instruction, and read, from a corresponding storage unit in the random number array based on the random number retrieval instruction, a random number stored in the storage unit.

In the random number generation device in the implementations of the present application, first, the generation module generates the random number array that includes the N storage units storing the random numbers; then, the random shuffling module performs random shuffling on the storage units in the random number array; and the reading module can receive the random number retrieval instruction, and read, from the corresponding storage unit in the random number array, the random number stored in the storage unit. Because the random shuffling module performs random shuffling on the storage units in the random number array, a plurality of random numbers obtained in a relatively short unit time have a low repetition rate to achieve balanced distribution. Therefore, the random number generation device in the present application can achieve relatively high randomness.

In an implementation of the present application, the N storage units store different random numbers.

In an implementation of the present application, in the random number generation device, each of the storage units has an identifier value, and the random shuffling module includes the following: an identifier value generation submodule, configured to generate a random value based on a random function, and generate an identifier value of a to-be-exchanged storage unit based on the random value; and an exchange submodule, configured to exchange a random number in the to-be-exchanged storage unit with a random number in a target storage unit based on the identifier value and a predetermined exchange rule.

In an implementation of the present application, in the random number generation device, when i is greater than 1 and less than N, the identifier value generation submodule generates the ith random value based on a current time and the (i−1)th random value, where i is the number of exchange times; or when i is equal to 1, the identifier value generation submodule generates the ith random value based on a current time.

In an implementation of the present application, the predetermined exchange rule is as follows: When the ith exchange is performed, a random number in a storage unit corresponding to the ith random value is exchanged with a random number in the (N+1−i)th storage unit.

In an implementation of the present application, the reading module includes the following: a retrieval submodule, configured to obtain an identifier value of a currently read storage unit based on the random number retrieval instruction; and a reading submodule, configured to read, based on the identifier value of the currently read storage unit, a random number stored in a next storage unit.

To achieve the previous purposes, a third aspect of the implementations of the present application provides a random number retrieval method, including the following steps: receiving a random number retrieval instruction, and obtaining a random number array, where the random number array includes N storage units, each of the storage units stores a random number, and locations of the N storage units in the random number array are determined through random shuffling, where N is a positive integer; and obtaining, from a corresponding storage unit in the random number array based on the random number retrieval instruction, a random number stored in the storage unit.

The random number retrieval method in the implementations of the present application includes the following: first, receiving the random number retrieval instruction; then obtaining the random number array, and determining the locations of the N storage units in the random number array through random shuffling; and reading, from the corresponding storage unit in the random number array based on the random number retrieval instruction, the random number stored in the storage unit. Because random shuffling is performed on the storage units in the random number array, a plurality of random numbers obtained in a relatively short unit time have a low repetition rate to achieve balanced distribution. Therefore, the random number retrieval method in the present application can achieve relatively high randomness.

In an implementation of the present application, the N storage units store different random numbers.

In an implementation of the present application, in the random number retrieval method, each of the storage units has an identifier value, and random shuffling is performed on the locations of the N storage units in the random number array by using the following steps: generating a random value based on a random function, and generating an identifier value of a to-be-exchanged storage unit based on the random value; and exchanging a random number in the to-be-exchanged storage unit with a random number in a target storage unit based on the identifier value and a predetermined exchange rule.

In an implementation of the present application, the obtaining, from a corresponding storage unit in the random number array based on the random number retrieval instruction, a random number stored in the storage unit includes the following: obtaining an identifier value of a currently read storage unit based on the random number retrieval instruction; and reading, based on the identifier value of the currently read storage unit, a random number stored in a next storage unit.

To achieve the previous purposes, a fourth aspect of the implementations of the present application provides a random number retrieval device, including: a receiving module, configured to receive a random number retrieval instruction; a random number array retrieval module, configured to obtain a random number array, where the random number array includes N storage units, each of the storage units stores a random number, and locations of the N storage units in the random number array are determined through random shuffling, where N is a positive integer; and a random number retrieval module, configured to obtain, from a corresponding storage unit in the random number array based on the random number retrieval instruction, a random number stored in the storage unit.

In the random number retrieval device in the implementations of the present application, first, the receiving module receives the random number retrieval instruction; then, the random number array retrieval module obtains the random number array, and the locations of the N storage units in the random number array are determined through random shuffling; and the random number retrieval module reads, from the corresponding storage unit in the random number array based on the received random number retrieval instruction, the random number stored in the storage unit. Because random shuffling is performed on the storage units in the random number array, a plurality of random numbers obtained in a relatively short unit time have a low repetition rate, to achieve balanced distribution. Therefore, the random number retrieval device in the present application can achieve relatively high randomness.

In an implementation of the present application, the N storage units store different random numbers.

In an implementation of the present application, the random number retrieval module includes: a first retrieval submodule, configured to obtain an identifier value of a currently read storage unit based on the random number retrieval instruction; and a second retrieval submodule, configured to obtain, based on the identifier value of the currently read storage unit, a random number stored in a next storage unit.

Additional aspects and advantages of the present application are partially provided in the following description. Some of them become apparent from the following description, or can be understood through the practice of the present application.

BRIEF DESCRIPTION OF DRAWINGS

The previous and/or additional aspects and advantages of the present application will become apparent and easy to understand in the description of the implementations with reference to the accompanying drawings.

DESCRIPTION OF IMPLEMENTATIONS

Figure 1:
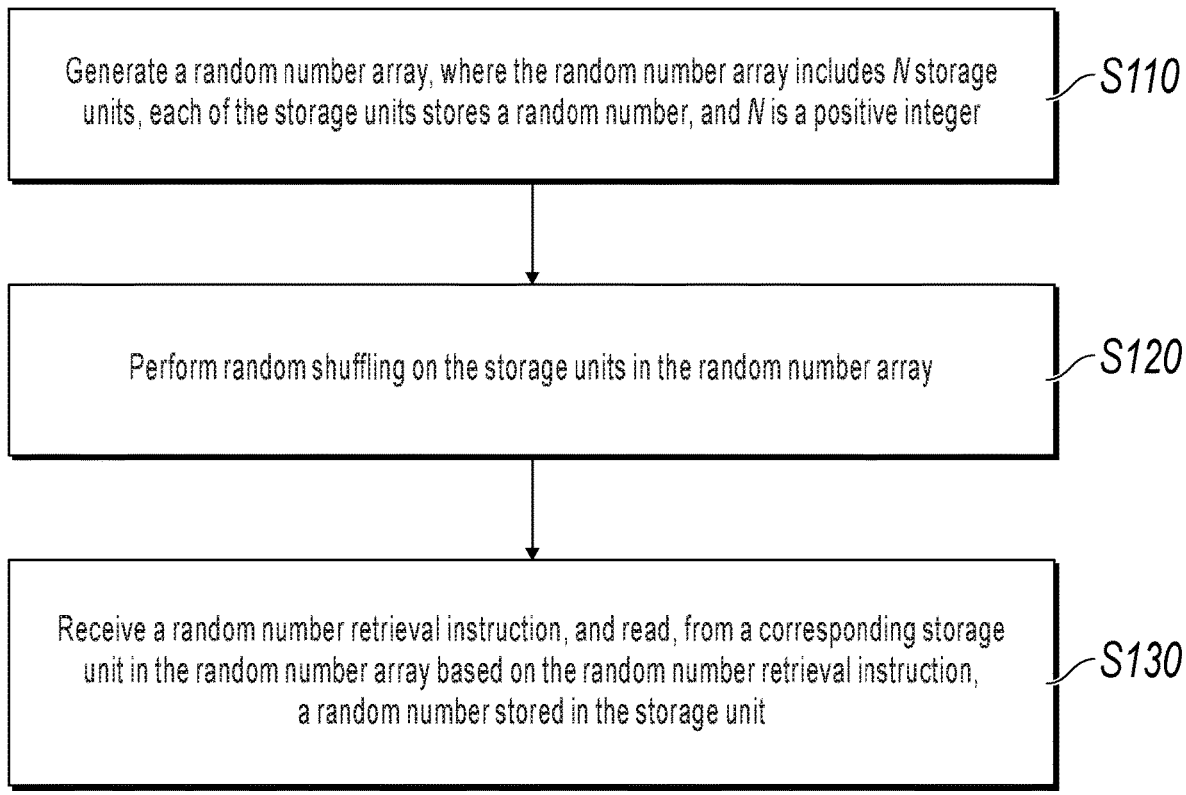
FIG. 1 is a flowchart illustrating a random number generation method, according to an implementation of the present application.

The following describes in detail the implementations of the present application. Examples of the implementations are shown in the accompanying drawings. The same or similar reference numerals indicate the same or similar elements, or elements having the same or similar functions. The implementations described below with reference to the accompanying drawings are examples, and are intended to explain the present application instead of limiting the present application.

In the present application, random shuffling is performed on storage units in a random number array, so that random numbers in the random number array are randomly shuffled. It resolves a problem of imbalanced distribution due to a large probability of repetition when a conventional random function is used. When a random number needs to be obtained, a corresponding random number can be obtained from the random number array.

FIG. 1 is a flowchart illustrating a random number generation method, according to an implementation of the present application.

As shown in FIG. 1, the random number generation method in the present implementation of the present application includes the following steps:

S110. Generate a random number array, where the random number array includes N storage units, each storage unit stores a random number, and N is a positive integer.

In the present implementation of the present application, the N storage units store different random numbers.

It can be understood that in the present implementation of the present application, the storage units in the generated random number array store different corresponding random numbers. For example, if one storage unit stores a random number 2, no other storage unit stores a random number 2.

In the present implementation of the present application, the N storage units each can store 1 to N integers, so that a random number stored in each storage unit is different from a random number stored in another storage unit.

In another implementation of the present application, a length of the random number array is configurable, and is set as required in advance.

S120. Perform random shuffling on the storage units in the random number array.

It is worthwhile to note that random shuffling in the present implementation of the present application indicates that random exchange is performed on random numbers stored in the N storage units in the random number array, so that the random numbers stored in the storage units are randomly shuffled. It resolves a problem of imbalanced distribution due to a large probability that repetition occurs when a random function in the existing technology is used. In the present implementation of the present application, the random numbers stored in the N storage units can be randomly exchanged using a plurality of methods. These methods are described in detail in later implementations. For a person skilled in the art, random shuffling can be performed on the random numbers stored in the random number array using a plurality of methods, so that the random numbers are randomly shuffled. Therefore, the present application is not limited to a random exchange algorithm mentioned in the following implementations of the present application. Any algorithm that can achieve the previous purpose should fall within the protection scope of the present application.

S130. Receive a random number retrieval instruction, and read, from a corresponding storage unit in the random number array based on the random number retrieval instruction, a random number stored in the storage unit.

In the present implementation of the present application, after the random number retrieval instruction is received, corresponding random numbers can be read from the random number array in sequence, or corresponding random numbers can be read from the random number array at random. Certainly, in the present implementation of the present application, the corresponding random numbers can be read from the random number array in another way.

In a specific implementation of the present application, after the random number retrieval instruction is received, an identifier value of a currently read storage unit (that is, an identifier value of a previously read storage unit) is obtained based on the random number retrieval instruction, and a random number stored in a next storage unit is read based on the identifier value of the currently read storage unit.

It is worthwhile to note that each time the random number retrieval instruction is received, whether the read storage unit is the last storage unit in the random number array is further determined. If no, the random number stored in the next storage unit is further read. If yes, a new random number array needs to be generated, that is, step S110 is performed.

The random number generation method in the present implementation of the present application includes the following: first, generating the random number array that includes the N storage units storing the random numbers; then, performing random shuffling on the storage units in the random number array; and receiving the random number retrieval instruction, and reading, from the corresponding storage unit in the random number array, the random number stored in the storage unit. Because random shuffling is performed on the storage units in the random number array, a plurality of random numbers obtained in a relatively short unit time have a low repetition rate, to achieve balanced distribution. Therefore, the random number generation method in the present application can achieve relatively high randomness.

Figure 2:
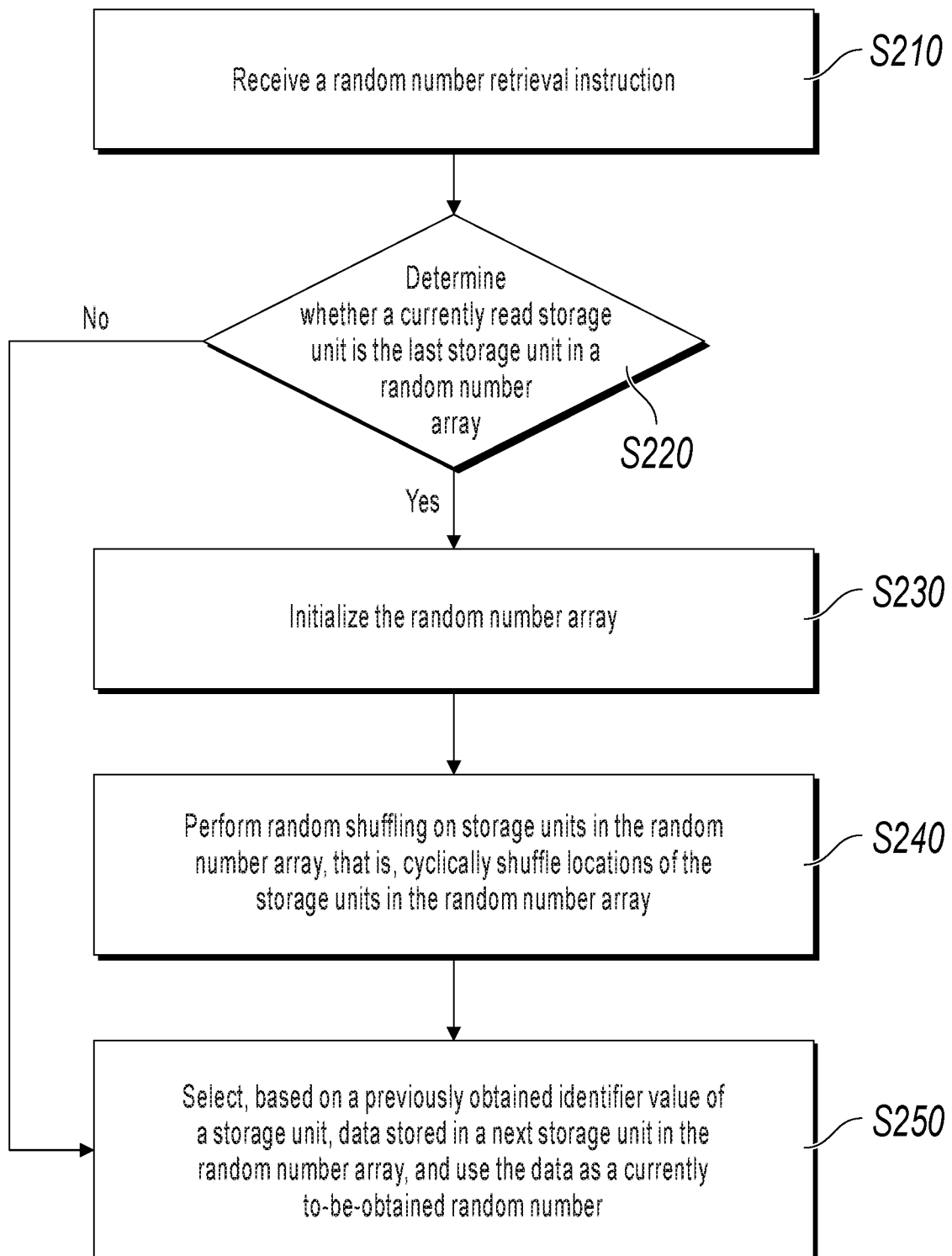
FIG. 2 is a flowchart illustrating a random number retrieval process, according to an implementation of the present application.

The following describes in detail a random number retrieval process in the present application with reference to FIG. 2, so that a person skilled in the art can understand the process.

S210. Receive a random number retrieval instruction.

S220. Determine whether a currently read storage unit is the last storage unit in a random number array.

Each time the random number retrieval instruction is received, whether the currently read storage unit is the last storage unit in the random number array is further determined. If no, a random number stored in a next storage unit is further read.

S230. If yes, initialize the random number array, and generate a new random number array.

If it is determined that the currently read storage unit is the last storage unit in the random number array, that is, random numbers stored in all storage units in the random number array have been read. Therefore, the random number array needs to be initialized, and the new random number array is generated.

In the present implementation of the present application, if it is determined that the current storage unit is not the last storage unit in the random number array, a random number stored in a corresponding storage unit is directly read from the storage unit in the random number array based on the random number retrieval instruction.

S240. Perform random shuffling on storage units in the random number array, that is, cyclically shuffle locations of the storage units in the random number array.

In the present implementation of the present application, the locations of the storage units in the random number array are cyclically shuffled, so that the random numbers stored in the storage units are randomly shuffled. It resolves a problem of imbalanced distribution due to a large probability that repetition occurs when a random function in the existing technology is used. In the present implementation of the present application, random exchange can be performed on the random numbers stored in the N storage units using a plurality of methods, so that the random numbers are randomly shuffled. The present implementation of the present application is not limited thereto.

S250. Select, based on a previously obtained identifier value of a storage unit, data stored in a next storage unit in the random number array, and use the data as a currently to-be-obtained random number.

An identifier value of a currently read storage unit (that is, an identifier value of a previously read storage unit) is obtained based on the random number retrieval instruction, and a random number stored in a next storage unit is read based on the identifier value of the currently read storage unit. For example, the random numbers can be read in sequence.

It is worthwhile to note that the corresponding random numbers can further be read from the random number array in another way. The present implementation of the present application is not limited to reading the corresponding random numbers from the random number array in sequence.

The random number generation method in the present application can be specified with reference to the number of seconds for a program in the JAVA language. Details are described as follows:

First, a random number array is initialized, and a storage unit is defined to obtain an identifier value and a length of the random number array. After the random number instruction is received, whether the current storage unit is the last storage unit in the random number array is determined. If no, a new random number array needs to be generated; then the storage units in the random number array are cyclically shuffled; and eventually the data stored in the next storage unit in the random number array is selected as the currently to-be-obtained random number based on the previously obtained identifier value of the storage unit.

It is worthwhile to note that the random number generation method in the present application is not limited to implementation based on the JAVA language, and can be implemented using another computer language.

The random number generation method in the present implementation of the present application includes the following: first generating the random number array that includes N storage units storing random numbers; then, performing random shuffling on the storage units in the random number array; and receiving the random number retrieval instruction, and reading, from a corresponding storage unit in the random number array, a random number stored in the storage unit. Because random shuffling is performed on the storage units in the random number array, a plurality of random numbers obtained in a relatively short unit time have a low repetition rate to achieve balanced distribution. Therefore, the random number generation method in the present application can achieve relatively high randomness.

Figure 3:
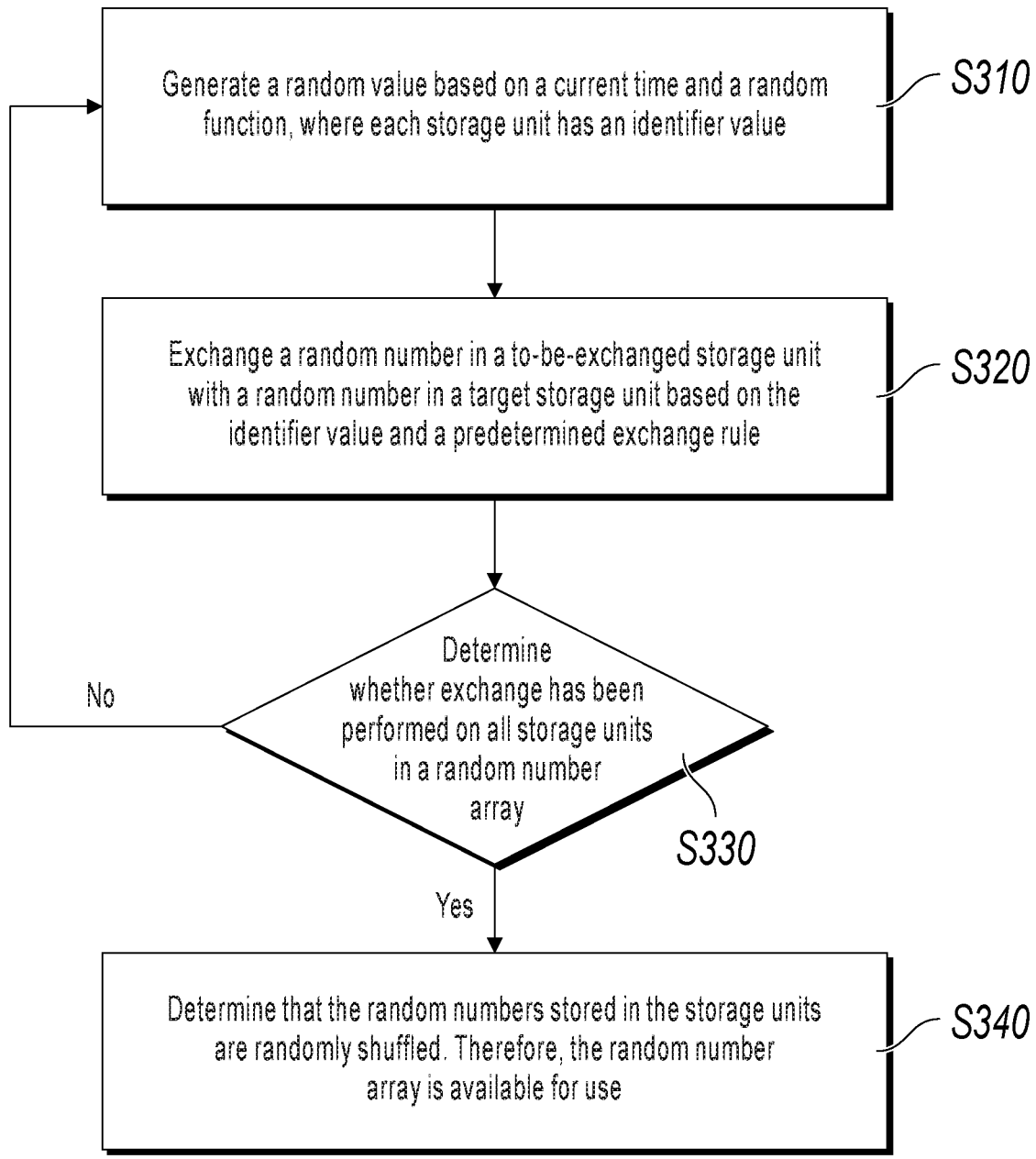
FIG. 3 is a flowchart illustrating a process in which random shuffling is performed on storage units in a random number array, according to an implementation of the present application.

The following describes in detail a process in which random shuffling is performed on the storage units in the random number array in the present application with reference to FIG. 3, so that a person skilled in the art can understand the process.

S310. Generate a random value based on a current time and a random function, where each storage unit has an identifier value. The identifier value is used to distinguish between identifiers of storage units. In the present implementation of the present application, an identifier value of a storage unit in an initial state (that is, before the random shuffling) can be equal to a random number stored in the storage unit.

It is worthwhile to note that the random value generated in step S310 is conceptually different from the random number stored in the storage unit. The random value generated in the present step is used to determine an identifier value of a to-be-exchanged storage unit.

When i is greater than 1 and less than N, the ith random value is generated based on a current time and the (i−1)th random value; or when i is equal to 1, the ith random value is generated based on a current time, where i is the number of exchange times. In other words, when the random value is generated for the first time, the random value is generated based on the current time. When the random value is not generated for the first time, the ith random value is generated based on the current time and the (i−1)th random value.

In the present implementation of the present application, after a random number array is generated, each storage unit has an identifier value. The random value is generated based on the random function, and the identifier value of the to-be-exchanged storage unit is generated based on the random value, to determine the to-be-exchanged storage unit.

S320. Exchange a random number in a to-be-exchanged storage unit with a random number in a target storage unit based on the identifier value and a predetermined exchange rule.

When the ith exchange is performed, a random number in a storage unit corresponding to the ith random value is exchanged with a random number in the (N+1−i)th storage unit.

For example, after the random number array is generated, each storage unit has an identifier value, and storage units can be distinguished based on the identifier values. When i is 1, the first random value is generated based on the current time, and an identifier value of a to-be-exchanged storage unit is generated based on the first random value. A random number in a storage unit corresponding to the first random value is exchanged with a random number in the Nth storage unit according to the predetermined exchange rule, that is, the random number in the storage unit corresponding to the first random value is stored in the Nth storage unit, and the random number in the Nth storage unit is stored in the storage unit corresponding to the first random value. When i is 2, the second random value is generated based on the current time and the first random value, and an identifier value of a to-be-exchanged storage unit is generated based on the second random value. A random number in a storage unit corresponding to the second random value is exchanged with a random number in the (N−1)th storage unit based on a predetermined exchange rule, that is, the random number in the storage unit corresponding to the second random value is stored in the (N−1)th storage unit, and the random number in the (N−1)th storage unit is stored in the storage unit corresponding to the second random value. By analogy, similar operations are performed until exchange is completed for the random numbers stored in all the storage units in the random number array. In the previous implementation, exchange is first performed between the storage unit corresponding to the identifier value in the first exchange calculation and the Nth storage unit. Alternatively, in another implementation of the present application, exchange can be first performed on the first storage unit.

For example, a random number array randArry[ ] is initialized. A natural number is assigned to each storage unit in the random number array. For example, randArry[0]=1, randArry[1]=2, . . . , and randArry[n−1]=n. Locations of the storage units in the random number array are cyclically shuffled. For example, a value stored in each storage unit in the random number array can be exchanged with a value stored in the ith to last storage unit, and i progressively decreases from n−1, for example, exchange is performed between randArry[1]=2 and randArry[n−1]=n.

It is worthwhile to note that the method for exchanging random numbers in storage units in the present implementation of the present application is only one type of the predetermined exchange rule. To be specific, the predetermined exchange rule can be set based on an actual requirement, and exchange is performed on random numbers in storage units by using different exchange methods.

S330. Determine whether exchange has been performed on all storage units in a random number array.

S340. If yes, determine that the random numbers stored in the storage units are randomly shuffled. Therefore, the random number array is available for use.

It is determined that exchange has been performed on all the random numbers stored in the N storage units in the random number array. The identifier value of the currently read storage unit is obtained based on the random number retrieval instruction, and a random number stored in a next storage unit is read based on the identifier value of the currently read storage unit.

It is worthwhile to note that the corresponding random numbers can be read from the random number array in another way. The present implementation of the present application is not limited to reading the corresponding random numbers from the random number array in sequence.

The random number generation method in the present implementation of the present application includes the following: first generating the random number array that includes the N storage units storing the random numbers; then, performing random shuffling on the storage units in the random number array; and receiving the random number retrieval instruction, and reading, from the corresponding storage unit in the random number array, the random number stored in the storage unit. Because random shuffling is performed on the storage units in the random number array, a plurality of random numbers obtained in a relatively short unit time have a low repetition rate, to achieve balanced distribution. Therefore, the random number generation method in the present application can achieve relatively high randomness.

Figure 4:
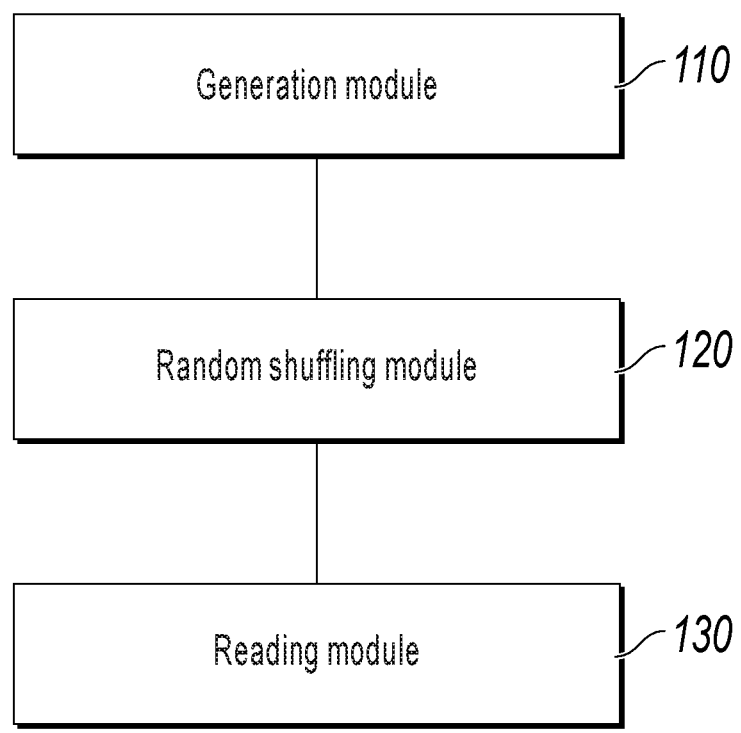
FIG. 4 is a schematic structural diagram illustrating a random number generation device, according to an implementation of the present application.

An implementation of the present disclosure further provides a random number generation device corresponding to the random number generation method provided in the previous implementations. Because the random number generation device provided in the present implementation of the present disclosure has the same or similar technical features with the random number generation method provided in the previous implementations, the previous implementations of the random number generation method are also applicable to the random number generation device provided in the present implementation, and are not described in detail in the present implementation. As shown in FIG. 4, the random number generation device can include a generation module 110, a random shuffling module 120, and a reading module 130.

The generation module 110 is configured to generate a random number array, where the random number array includes N storage units, each of the storage units stores a random number, and N is a positive integer.

In an implementation of the present application, the N storage units store different random numbers.

The random shuffling module 120 is configured to perform random shuffling on the storage units in the random number array.

The reading module 130 is configured to receive a random number retrieval instruction, and read, from a corresponding storage unit in the random number array based on the random number retrieval instruction, a random number stored in the storage unit.

Figure 5:
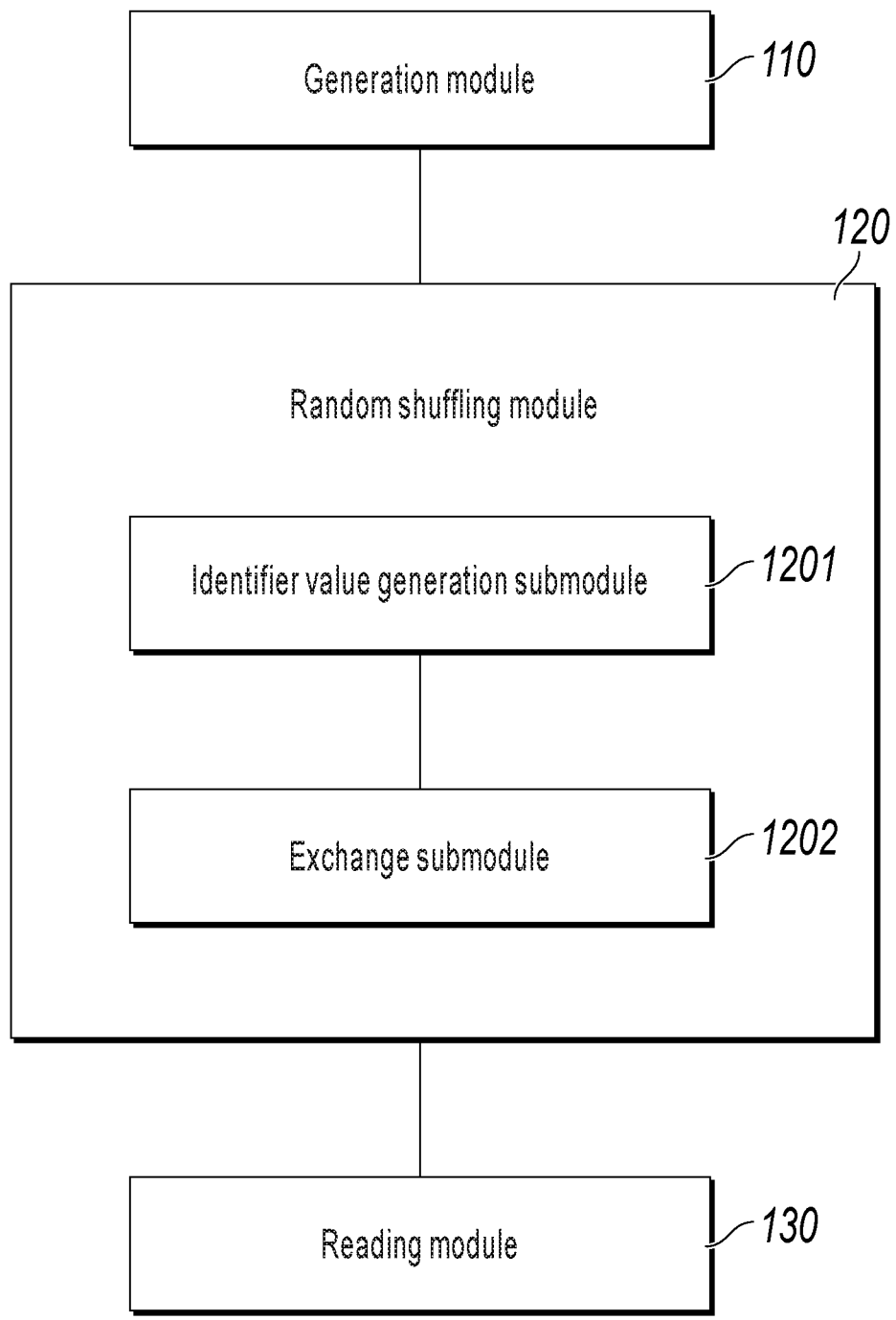
FIG. 5 is a schematic structural diagram illustrating a random number generation device, according to another implementation of the present application.

In an implementation of the present application, FIG. 5 is a schematic structural diagram illustrating a random number generation device, according to another implementation of the present application. That is, based on FIG. 4, as shown in FIG. 5, the random shuffling module 120 includes an identifier value generation submodule 1201 and an exchange submodule 1202. In an implementation of the present application, the identifier value generation submodule 1201 is configured to generate a random value based on a random function, and generate an identifier value of a to-be-exchanged storage unit based on the random value. The exchange submodule 1202 is configured to exchange a random number in the to-be-exchanged storage unit with a random number in a target storage unit based on the identifier value and a predetermined exchange rule.

In an implementation of the present application, when i is greater than 1 and less than N, the identifier value generation submodule 1201 generates the ith random value based on a current time and the (i−1)th random value, where i is the number of exchange times; or when i is equal to 1, the identifier value generation submodule 1201 generates the ith random value based on a current time.

In an implementation of the present application, the predetermined exchange rule is as follows: When the ith exchange is performed, a random number in a storage unit corresponding to the ith random value is exchanged with a random number in the (N+1−i)th storage unit.

In an implementation of the present application, after the random number retrieval instruction is received, whether the current storage unit is the last storage unit in the random number array is determined. If no, a random number stored in a next storage unit is read; or if yes, a new random number array needs to be generated.

Figure 6:
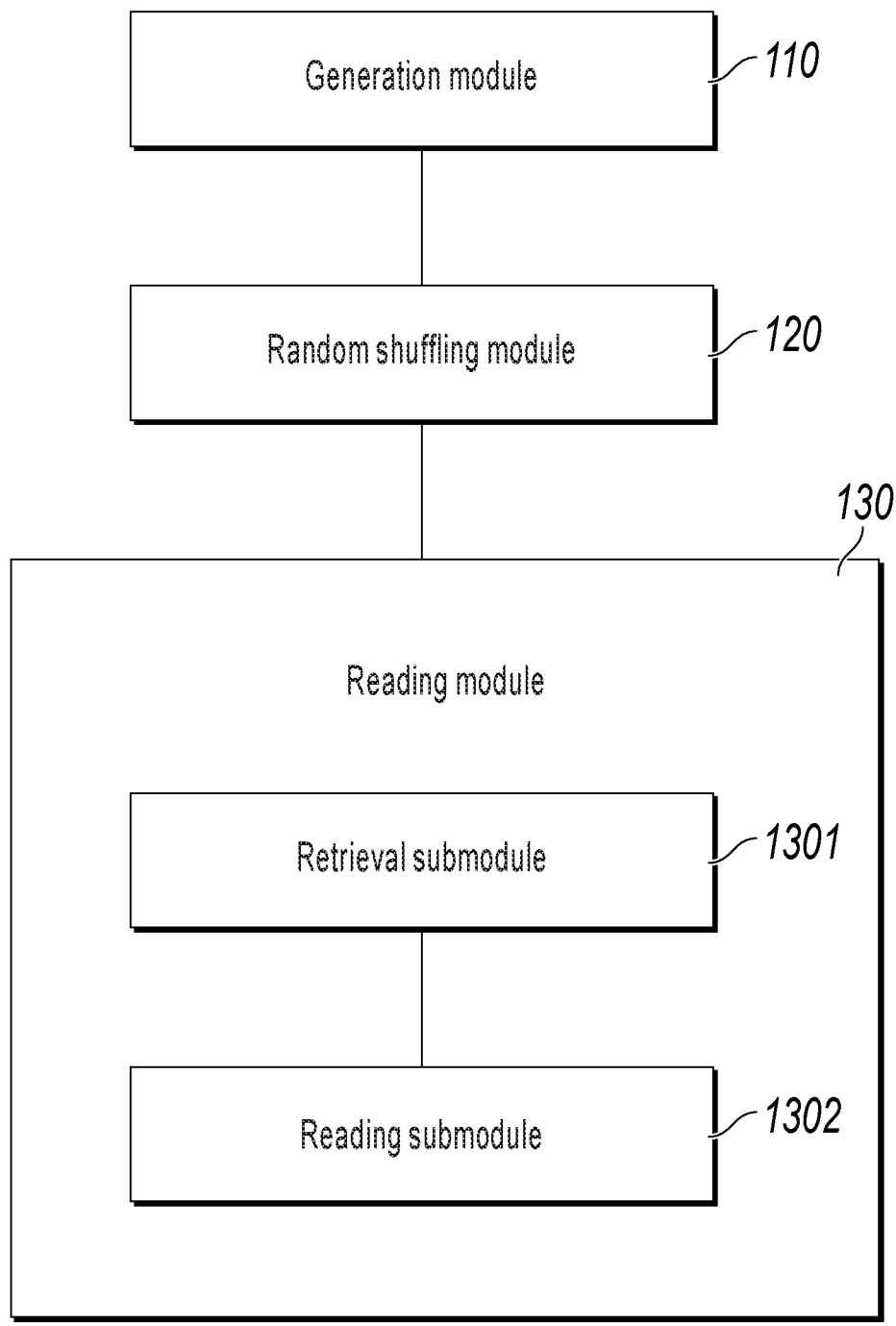
FIG. 6 is a schematic structural diagram illustrating a random number generation device, according to still another implementation of the present application.

In an implementation of the present application, FIG. 6 is a schematic structural diagram illustrating a random number generation device, according to another implementation of the present application. Based on FIG. 4, the reading module 130 includes the following: a retrieval submodule 1301 and a reading submodule 1302.

The retrieval submodule 1301 is configured to obtain an identifier value of a currently read storage unit based on a random number retrieval instruction. The reading submodule 1302 is configured to read, based on the identifier value of the currently read storage unit, a random number stored in a next storage unit.

In the random number generation device in the present implementation of the present application, first, a generation module generates a random number array that includes N storage units storing random numbers; then, a random shuffling module performs random shuffling on the storage units in the random number array; and the reading module can receive the random number retrieval instruction, and read, from a corresponding storage unit in the random number array, a random number stored in the storage unit. Because the random shuffling module performs random shuffling on the storage units in the random number array, a plurality of random numbers obtained in a relatively short unit time have a low repetition rate, to achieve balanced distribution. Therefore, the random number generation device in the present application can achieve relatively high randomness.

Figure 7:
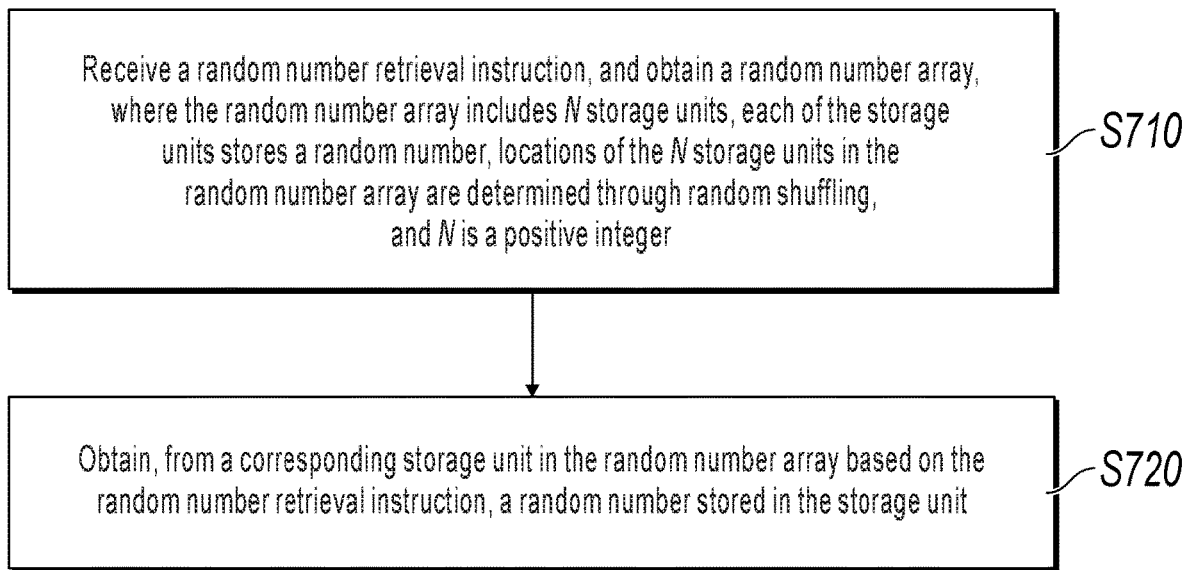
FIG. 7 is a flowchart illustrating a random number retrieval method, according to an implementation of the present application.

FIG. 7 is a flowchart illustrating a random number retrieval method, according to an implementation of the present application. The random number retrieval method shown in the present implementation of the present application is described from a retrieval perspective. As shown in FIG. 7, the random number retrieval method includes the following steps:

S710. Receive a random number retrieval instruction, and obtain a random number array, where the random number array includes N storage units, each of the storage units stores a random number, locations of the N storage units in the random number array are determined through random shuffling, and N is a positive integer.

In the present implementation of the present application, the N storage units store different random numbers.

In the present implementation of the present application, the N storage units each can store 1 to N integers, so that a random number stored in each storage unit is different from a random number stored in another storage unit.

In another implementation of the present application, a length of the random number array is configurable, and is set as required in advance.

In the present implementation of the present application, after the random number array is generated, each storage unit has an identifier value. A random value is generated based on a random function, and an identifier value of a to-be-exchanged storage unit is generated based on the random value, to determine the to-be-exchanged storage unit.

In the present implementation of the present application, a random number in the to-be-exchanged storage unit is exchanged with a random number in a target storage unit based on the identifier value and a predetermined exchange rule.

It is worthwhile to note that the method for exchanging random numbers in storage units in the present implementation of the present application is only one type of the predetermined exchange rule. That is, the predetermined exchange rule can be set based on an actual requirement, and exchange is performed on random numbers in storage units by using different exchange methods.

S720. Obtain, from a corresponding storage unit in the random number array based on the random number retrieval instruction, a random number stored in the storage unit.

In a specific implementation of the present application, after the random number retrieval instruction is received, an identifier value of a currently read storage unit (that is, an identifier value of a previously read storage unit) is obtained based on the random number retrieval instruction, and a random number stored in a next storage unit is read based on the identifier value of the currently read storage unit.

The random number retrieval method in the present implementation of the present application includes the following: first, receiving the random number retrieval instruction; then obtaining the random number array, and determining locations of the N storage units in the random number array through random shuffling; and reading, from the corresponding storage unit in the random number array based on the received random number retrieval instruction, the random number stored in the storage unit. Because random shuffling is performed on the storage units in the random number array, a plurality of random numbers obtained in a relatively short unit time have a low repetition rate, to achieve balanced distribution. Therefore, the random number retrieval method in the present application can achieve relatively high randomness.

Figure 8:
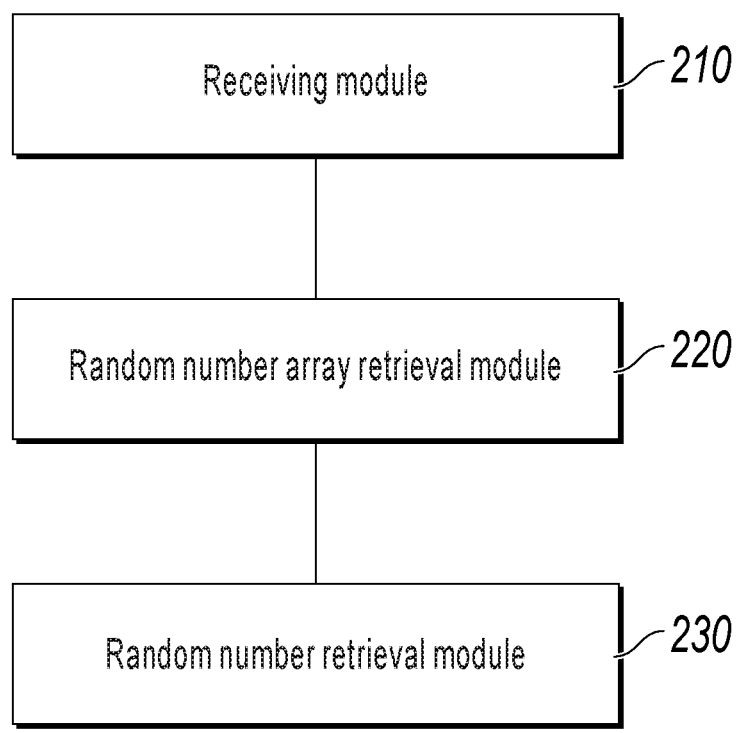
FIG. 8 is a schematic structural diagram illustrating a random number retrieval device, according to an implementation of the present application.

An implementation of the present disclosure further provides a random number retrieval device corresponding to the random number retrieval method provided in the previous implementations. The random number retrieval device provided in the present implementation of the present disclosure has the same or similar technical features with the random number retrieval method provided in the previous implementations. Therefore, the implementations of the random number retrieval method are also applicable to the random number retrieval device provided in the present implementation. Details are not described in the present implementation. As shown in FIG. 8, the random number retrieval device can include: a receiving module 210, a random number array retrieval module 220, and a random number retrieval module 230.

The receiving module 210 is configured to receive a random number retrieval instruction.

The random number array retrieval module 220 is configured to obtain a random number array, where the random number array includes N storage units, each of the storage units stores a random number, locations of the N storage units in the random number array are determined through random shuffling, and N is a positive integer.

In an implementation of the present application, the N storage units store different random numbers.

The random number retrieval module 230 is configured to obtain, from a corresponding storage unit in the random number array based on the random number retrieval instruction, a random number stored in the storage unit.

Figure 9:
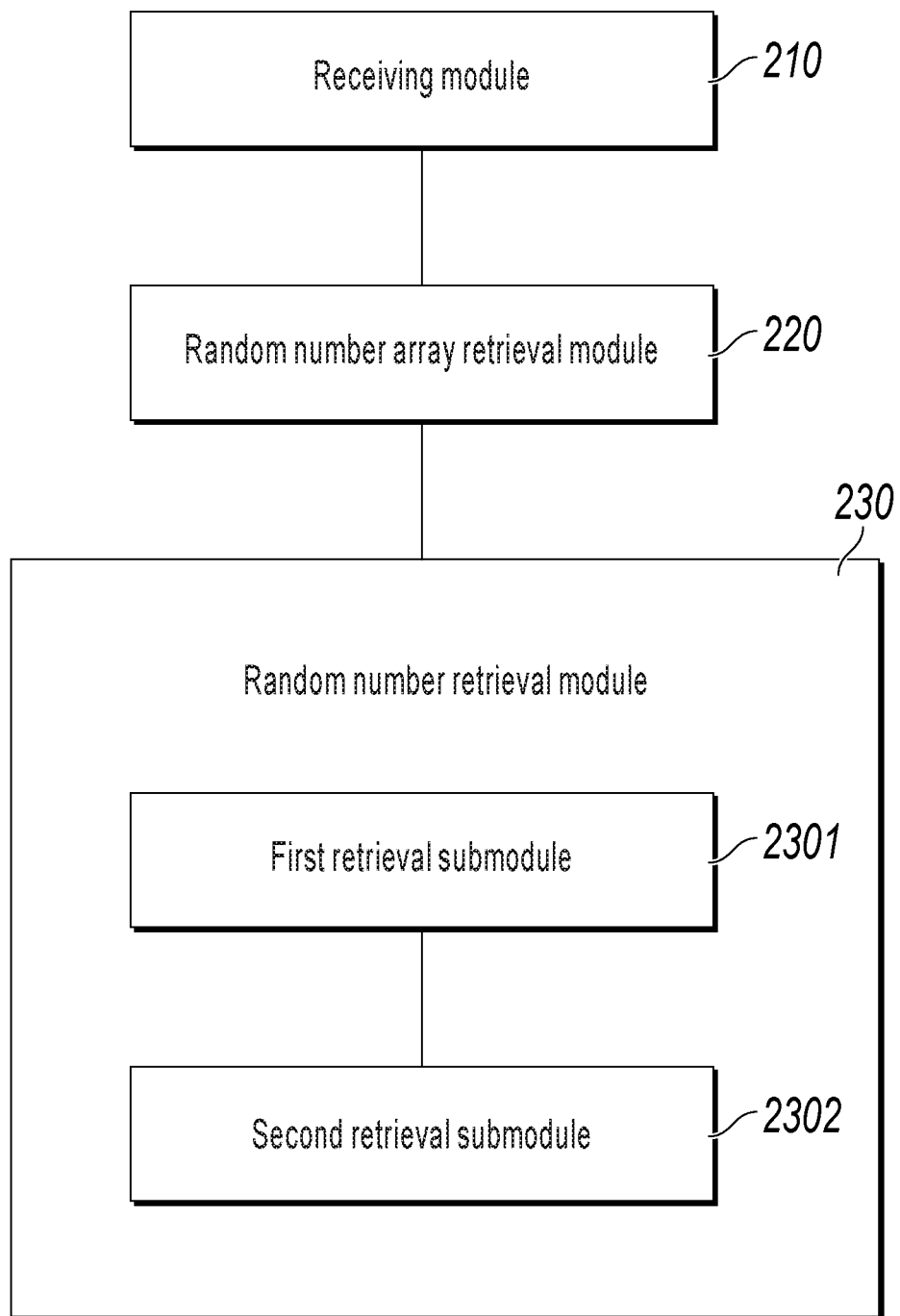
FIG. 9 is a schematic structural diagram illustrating a random number retrieval device, according to another implementation of the present application.

In an implementation of the present application, FIG. 9 is a schematic structural diagram illustrating a random number retrieval device, according to another implementation of the present application. Based on FIG. 8, the random number retrieval module 230 shown in FIG. 9 includes the following: a first retrieval submodule 2301, configured to obtain an identifier value of a currently read storage unit based on the random number retrieval instruction; and a second retrieval submodule 2302, configured to obtain, based on the identifier value of the currently read storage unit, a random number stored in a next storage unit.

In the random number retrieval device in the present implementation of the present application, first, a receiving module receives a random number retrieval instruction; then, a random number array retrieval module obtains a random number array, and locations of N storage units in the random number array are determined through random shuffling; and a random number retrieval module reads, from a corresponding storage unit in the random number array based on the received random number retrieval instruction, the random number stored in the storage unit. Because random shuffling is performed on the storage units in the random number array, a plurality of random numbers obtained in a relatively short unit time have a low repetition rate, to achieve balanced distribution. Therefore, the random number retrieval device in the present application can achieve relatively high randomness.

In the description of the present application, it should be understood that terms "first" and "second" are merely used to description, and cannot be understood as an indication or implication of relative importance or implicit indication of the number of indicated technical features. Therefore, a characteristic modified by "first" or "second" can explicitly or implicitly include one or more features. In the description of the present application, "a plurality of" means at least two, for example, two or three, unless otherwise stated.

In the description of the present specification, reference terms such as "an implementation", "some implementations", "an example", "a specific example", and "some examples" mean that specific features, structures, materials, or characteristics described with reference to the implementation or the example are included in one or more implementations or examples in the present application. In the present specification, the previous terms are described not necessarily for the same implementation or example. In addition, the described specific features, structures, materials, or characteristics can be combined in a proper way in any one or more implementations or examples. Further, a person skilled in the art can combine uncontradicted features of different implementations or examples described in the present specification.

Any process or method description described in the flowchart or in another way can be understood as a module, a segment, or a part of code of an executable instruction that includes one or more steps to implement a specific logical function or process, and the implementations of the present application include another implementation in which functions can be performed in a sequence different from the shown or discussed sequence, for example, the related functions are performed simultaneously or in a reverse sequence. It should be understood by a person skilled in the art related to the implementations of the present application.

It should be understood that parts of the present application can be implemented by hardware, software, firmware, or a combination thereof. In the previous implementations, a plurality of steps or methods can be implemented by using software that is stored in a memory and executed by an appropriate instruction execution system or firmware. For example, if the steps or the methods are implemented by using hardware that can be implemented by using any one or a combination of the following technologies in the art: a discrete logic circuit including a logic gate circuit for implementing logical functions of a data signal, an application-specific integrated circuit having a proper combinational logic gate circuit, a programmable gate array (PGA), a field programmable gate array (FPGA), etc.

A person of ordinary skill in the art can understand that all or some of the steps in the method implementations can be implemented by a program instructing relevant hardware. The program can be stored in a computer readable storage medium. When the program runs, one of or a combination of the steps in the method implementations is performed.

In addition, functional units in the implementations of the present application can be integrated into one processing module, or each of the units can exist alone physically, or two or more units are integrated into one module. The integrated module can be implemented in a form of hardware, or can be implemented in a form of a software functional module. When the integrated module is implemented in the form of a software functional module and sold or used as an independent product, the integrated module can be stored in a computer-readable storage medium.

The previous storage medium can be a read-only memory, a magnetic disk, an optical disk, etc. Although the implementations of the present application have been shown and described above, it can be understood that the previous implementations are examples and cannot be understood as a limitation on the present application. A person of ordinary skill in the art can make change, modification, replacement, and modification to the previous implementations within the scope of the present application.

Figure 10:
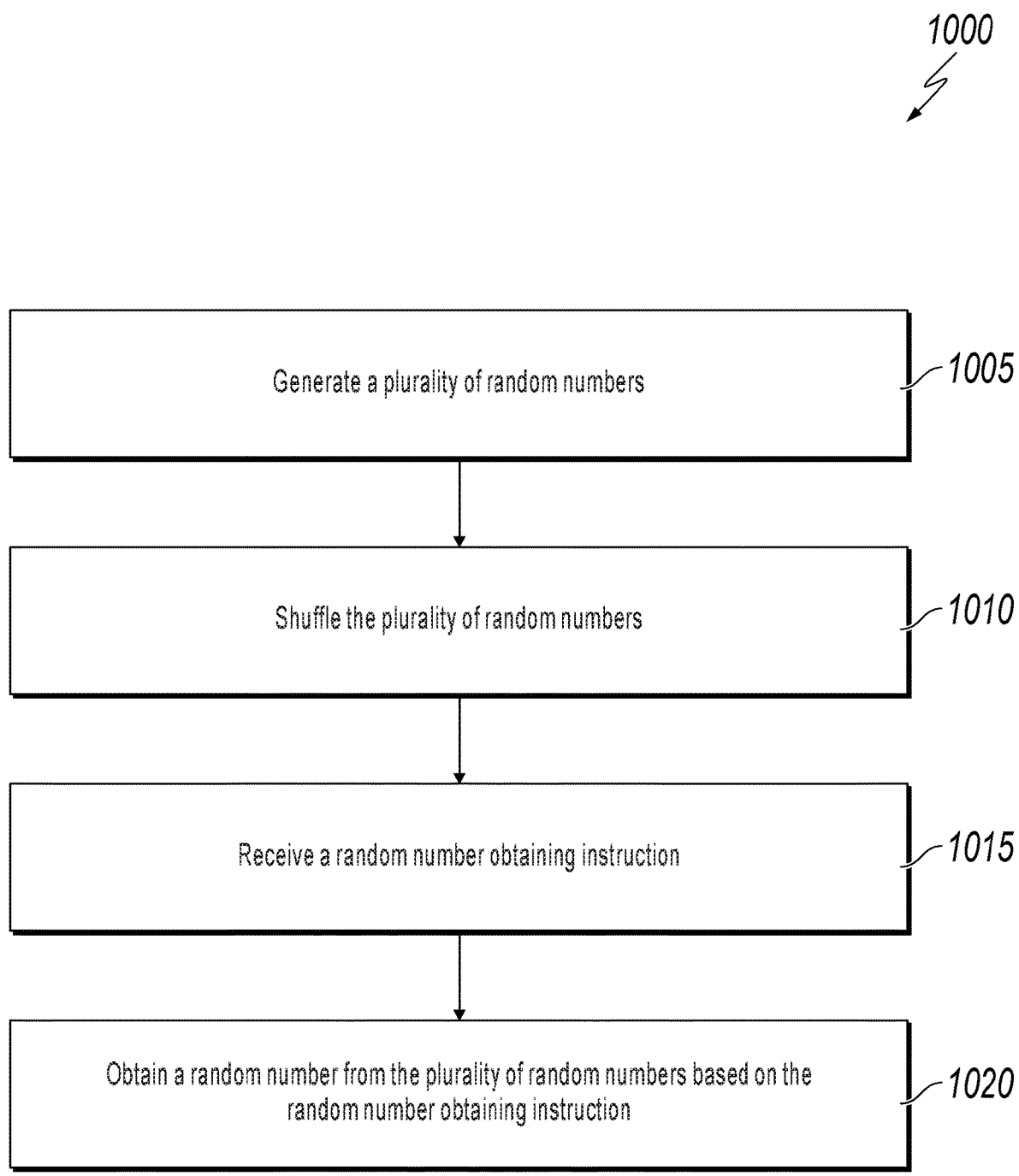
FIG. 10 is a flowchart illustrating an example of a computer-implemented method for generating a random number from multiple pre-generated random numbers, according to an implementation of the present disclosure.

FIG. 10 is a flowchart illustrating an example of a computer-implemented method 1000 for generating a random number from multiple pre-generated random numbers, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1005, a plurality of random numbers are generated. In some implementations, the plurality of random numbers can be generated using one or more commonly-used random number generation methods (such as, a software random number generation method, and a hardware random number generation method). In some implementations, the plurality of random numbers are N different random numbers, where N is a positive integer, and can be configured statically, dynamically, or both statically and dynamically. For example, a random number array including N storage units can be generated. Each storage unit of the N storage units stores a particular random number of the N random numbers. From 1005, method 1000 proceeds to 1010.

At 1010, the plurality of random numbers are shuffled. In some implementations, the plurality of random numbers can be shuffled automatically after the plurality of random numbers are generated. In some cases, the plurality of random numbers can be randomly shuffled. In some implementations, the plurality of random numbers can be shuffled based on a predetermined rule. For example, a random value can be generated based on a current time (such as a current system time), a random function, or a combination of both. Based on the random value, a first random number in the plurality of random numbers can be exchanged with a second random number in the plurality of random numbers. The first random number, the second random number, or both the first and second random numbers can be determined based on at least one of the random value and the predetermined rule. In some implementations, the random value generation and the random numbers exchanging procedure can be repeated or iterated (for example, until a terminating condition is reached (such as, N times)).

In some implementations, each storage unit of the N storage units is associated with a particular identifier. In other words, an identifier can be used to uniquely identify a storage unit associated with the identifier. A plurality of random values can be generated. For each generated random value, two random numbers stored in the N storage units can be exchanged (or shuffled). For example, an ith random value can be generated. i is a positive integer from 1 to N, and indicates the number of times random numbers being exchanged (or shuffled) among the N storage units. If i is equal to 1 (that is, the first time to shuffle the random numbers), the ith random value can be generated based on the current time. If i is greater than 1 and less than N (that is, not the first time to shuffle the random numbers), the ith random value can be generated based on the current time and the (i−1)th random value. After the ith random value has been generated, a random number stored in a first storage unit of the N storage units is exchanged with a random number stored in a second storage unit of the N storage units. In some implementations, a first identifier can be determined based on the ith random value. The first storage unit of the N storage units can be determined based on the first identifier since the first identifier is associated with the first storage unit. The second storage unit of the N storage units can be determined as the (N+1−i)th storage unit of the N storage units. From 1010, method 1000 proceeds to 1015.

At 1015, a random number obtaining instruction is received. The random number obtaining instruction can be an instruction requesting for a random number. The random number obtaining instruction can be received after the plurality of random numbers are generated, or generated and shuffled. In other words, instead of generating the requested random number after receiving the random number obtaining instruction, the requested random number has already been generated and is among the plurality of random numbers before receiving the random number obtaining instruction. From 1015, method 1000 proceeds to 1020.

At 1020, a random number is obtained from the plurality of random numbers based on the random number obtaining instruction. In some implementations, the random number can be obtained from the plurality of random numbers sequentially, randomly, or in any suitable order. In some implementations, if the random number obtaining instruction is the first random number obtaining instruction received after the plurality of random numbers are generated, the random number can be obtained from the first storage unit of the N storage units. If the random number obtaining instruction is not the first random number obtaining instruction received after the plurality of random numbers are generated, a storage unit where the last random number is obtained can be determined based on the random number obtaining instruction. The random number then can be obtained from a storage unit next to the storage unit where the last random number is obtained.

In some implementations, after the random number is obtained, a determination is made as to whether each random number of the plurality of random numbers has been obtained. If it is determined that each random number of the plurality of random numbers has been obtained (that is, all pre-generated random numbers have been used), the plurality of random numbers can be replaced (such as, initializing the random number array, or generating a new random number array). For example, a second plurality of random numbers, different from the plurality of random numbers, can be automatically generated in response to the determination (similar to those described in step 1005). The second plurality of random numbers can be shuffled (similar to those described in step 1010). In some implementations, the plurality of random numbers can be replaced when the number of random numbers in the plurality of random numbers that have not been obtained is less than a threshold. In some cases, the threshold can be configured statically, dynamically, or both statically and dynamically. After 1020, method 1000 stops.

Normally, a random number can be generated using system time as a seed. However, random numbers generated within a relatively short time period (such as, a same millisecond) have a high repetition rate, resulting in imbalanced distribution of random numbers (such as, pseudorandom numbers). The subject matter described in this specification can be used to generate a random number from multiple pre-generated random numbers. For example, multiple different random numbers can be pre-generated. In addition, the multiple different random number can be shuffled randomly. When receiving a request to generate a random number, instead of generating the requested random number, the requested random number can be obtained from the pre-generated and shuffled multiple different random numbers. As a result, when several random numbers are needed in a relatively short time period, instead of generating the several random numbers within the relatively short time period, the several random numbers can be obtained from the pre-generated and shuffled multiple different random numbers, thereby reducing the repetition rate of the several random numbers and achieving balanced distribution of the several random numbers. In some cases, reducing the repetition rate can increase processing efficiency and overall computer/computer system performance. Also, specialized hardware is not needed for random number generation, as the described technique permits software generation of random numbers without the known deficiencies of conventional software techniques.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   automatically generating, by a first hardware random number generator of an electronic device, a plurality of random numbers based on a random function, wherein the plurality of random numbers are N different random numbers, N is a positive integer, generating the plurality of random numbers includes generating a random number array including N storage units, each storage unit of the N storage units stores a particular random number of the N random numbers, and each storage unit of the N storage units is associated with a particular identifier;
   automatically shuffling, by the electronic device, the plurality of random numbers, wherein automatically shuffling the plurality of random numbers includes:
      generating an ith random value by a second hardware random number generator of the electronic device, wherein i is a positive integer from 1 to N and indicates the number of times random numbers being exchanged among the N storage units; and
      exchanging a random number in a first storage unit of the N storage units with a random number in a second storage unit of the N storage units based on the ith random value and a predetermined rule;
   receiving, by the electronic device, a random number obtaining instruction;
   obtaining, by the electronic device, a random number from the plurality of random numbers based on the random number obtaining instruction; and
   returning, by the electronic device, the random number.

2. The computer-implemented method of claim 1, wherein generating the ith random value includes:
   if i is greater than 1 and less than N, generating the ith random value based on a current time and the (i−1)th random value; and
   if i is equal to 1, generating the ith random value based on the current time.

3. The computer-implemented method of claim 1, wherein exchanging the random number in the first storage unit of the N storage units with the random number in the second storage unit of the N storage units based on the ith random value and the predetermined rule includes:
   determining an identifier based on the ith random value;
   determining the first storage unit of the N storage units based on the identifier, wherein the identifier is associated with the first storage unit;
   determining the second storage unit of the N storage units, wherein the second storage unit is the (N+1−i)th storage unit of the N storage units; and
   exchanging the random number in the first storage unit with the random number in the second storage unit.

4. The computer-implemented method of claim 1, wherein obtaining the random number from the plurality of random numbers based on the random number obtaining instruction includes:
   determining, based on the random number obtaining instruction, a storage unit where the last random number is obtained; and
   obtaining the random number from a storage unit next to the storage unit where the last random number is obtained.

5. The computer-implemented method of claim 1, further comprising:
   determining that each random number of the plurality of random numbers has been obtained; and
   in response to the determination:
      generating a second plurality of random numbers; and
      shuffling the second plurality of random numbers.

6. A non-transitory, computer-readable medium storing one or more instructions executable by a computer system to perform operations comprising:
   automatically generating, by a first hardware random number generator of an electronic device, a plurality of random numbers based on a random function, wherein the plurality of random numbers are N different random numbers, N is a positive integer, generating the plurality of random numbers includes generating a random number array including N storage units, each storage unit of the N storage units stores a particular random number of the N random numbers, and each storage unit of the N storage units is associated with a particular identifier;
   automatically shuffling, by the electronic device, the plurality of random numbers, wherein automatically shuffling the plurality of random numbers includes:
      generating an ith random value by a second hardware random number generator of the electronic device, wherein i is a positive integer from 1 to N and indicates the number of times random numbers being exchanged among the N storage units; and
      exchanging a random number in a first storage unit of the N storage units with a random number in a second storage unit of the N storage units based on the ith random value and a predetermined rule;
   receiving, by the electronic device, a random number obtaining instruction;
   obtaining, by the electronic device, a random number from the plurality of random numbers based on the random number obtaining instruction; and
   returning, by the electronic device, the random number.

7. The non-transitory, computer-readable medium of claim 6, wherein generating the ith random value includes:
   if i is greater than 1 and less than N, generating the ith random value based on a current time and the (i−1)th random value; and if i is equal to 1, generating the ith random value based on the current time.

8. The non-transitory, computer-readable medium of claim 6, wherein exchanging the random number in the first storage unit of the N storage units with the random number in the second storage unit of the N storage units based on the ith random value and the predetermined rule includes:
   determining an identifier based on the ith random value;
   determining the first storage unit of the N storage units based on the identifier, wherein the identifier is associated with the first storage unit;
   determining the second storage unit of the N storage units, wherein the second storage unit is the (N+1−i)th storage unit of the N storage units; and
   exchanging the random number in the first storage unit with the random number in the second storage unit.

9. The non-transitory, computer-readable medium of claim 6, wherein obtaining the random number from the plurality of random numbers based on the random number obtaining instruction includes:
   determining, based on the random number obtaining instruction, a storage unit where the last random number is obtained; and
   obtaining the random number from a storage unit next to the storage unit where the last random number is obtained.

10. The non-transitory, computer-readable medium of claim 6, the operations further comprising:
    determining that each random number of the plurality of random numbers has been obtained; and
    in response to the determination:
       generating a second plurality of random numbers; and
       shuffling the second plurality of random numbers.

11. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       automatically generating by a first hardware random number generator of an electronic device, a plurality of random numbers based on a random function, wherein the plurality of random numbers are N different random numbers, N is a positive integer, generating the plurality of random numbers includes generating a random number array including N storage units, each storage unit of the N storage units stores a particular random number of the N random numbers, and each storage unit of the N storage units is associated with a particular identifier;
       automatically shuffling the plurality of random numbers, wherein automatically shuffling the plurality of random numbers includes:
          generating an ith random value by a second hardware random number generator of the electronic device, wherein i is a positive integer from 1 to N and indicates the number of times random numbers being exchanged among the N storage units; and
          exchanging a random number in a first storage unit of the N storage units with a random number in a second storage unit of the N storage units based on the ith random value and a predetermined rule;
       receiving a random number obtaining instruction;
       obtaining a random number from the plurality of random numbers based on the random number obtaining instruction; and
       returning the random number.

12. The computer-implemented system of claim 11, wherein generating the ith random value includes:
    if i is greater than 1 and less than N, generating the ith random value based on a current time and the (i−1)th random value; and
    if i is equal to 1, generating the ith random value based on the current time.

13. The computer-implemented system of claim 11, wherein exchanging the random number in the first storage unit of the N storage units with the random number in the second storage unit of the N storage units based on the ith random value and the predetermined rule includes:
    determining an identifier based on the ith random value;
    determining the first storage unit of the N storage units based on the identifier, wherein the identifier is associated with the first storage unit;
    determining the second storage unit of the N storage units, wherein the second storage unit is the (N+1−i)th storage unit of the N storage units; and
    exchanging the random number in the first storage unit with the random number in the second storage unit.

14. The computer-implemented system of claim 11, wherein obtaining the random number from the plurality of random numbers based on the random number obtaining instruction includes:
    determining, based on the random number obtaining instruction, a storage unit where the last random number is obtained; and
    obtaining the random number from a storage unit next to the storage unit where the last random number is obtained.

* * * * *

UNITED STATES PATENT AND TRADEMARK OFFICE
CERTIFICATE OF CORRECTION

PATENT NO. : 10,691,415 B2  
APPLICATION NO. : 16/131352  
DATED : June 23, 2020  
INVENTOR(S) : Jiaxiang Wen Page 1 of 1

It is certified that error appears in the above-identified patent and that said Letters Patent is hereby corrected as shown below:

In the Claims

In Column 21, Line 43. Claim 11, after "generating" insert --,--.

Signed and Sealed this
Twenty-fifth Day of August, 2020

Andrei Iancu
*Director of the United States Patent and Trademark Office*